United States Patent [19]
Packham

[11] Patent Number: 5,984,017
[45] Date of Patent: Nov. 16, 1999

[54] MULTI-FUNCTION TILLAGE APPARATUS AND METHOD

[76] Inventor: Lester M. Packham, 3932 Christmas Tree Ln, Bakersfield, Calif. 93306

[21] Appl. No.: 09/170,272

[22] Filed: Oct. 13, 1998

Related U.S. Application Data

[63] Continuation of application No. 08/194,069, Feb. 9, 1994.

[51] Int. Cl.⁶ .......................... A01B 79/00; A01B 15/02; A01B 23/04
[52] U.S. Cl. .............................. 172/1; 172/195; 172/201; 172/686; 172/754
[58] Field of Search .................................... 172/754, 758, 172/759, 133, 195, 201, 202, 203, 1, 686

[56] References Cited

U.S. PATENT DOCUMENTS

| | | |
|---|---|---|
| 1,320 | 9/1839 | Barnaby . |
| 114,044 | 4/1871 | Rider . |
| 2,299,381 | 10/1942 | Collins ................................ 172/754 X |
| 5,063,999 | 11/1991 | Packham ............................ 172/754 X |

FOREIGN PATENT DOCUMENTS

| | | | |
|---|---|---|---|
| 608058 | 12/1934 | Germany ................................ 172/754 |
| 738530 | 6/1980 | U.S.S.R. ................................. 172/754 |
| 913955 | 3/1982 | U.S.S.R. ................................. 172/754 |
| 1093273 | 5/1984 | U.S.S.R. ................................. 172/754 |
| 1473725 | 4/1989 | U.S.S.R. ................................. 172/754 |

*Primary Examiner*—Christopher J. Novosad
*Attorney, Agent, or Firm*—Dennis B. Haase

[57] ABSTRACT

In a tillage device having first and second plow assemblies mounted in parallel relation on a main frame to thereby cut furrows in the soil creating soil strips in so doing and depositing the soil strips on a berm between the furrows created by the plow assemblies and having a rearwardly located plow assembly for moving the soil under the berm outwardly into the first and second furrows thereby creating a middle furrow and allowing the soil on the berm to fall into the middle furrow.

16 Claims, 5 Drawing Sheets

MULTI-FUNCTION TILLAGE APPARATUS AND METHOD

This application is filed under Section 1.53(b) and is a continuation of application Ser. No. 194,069, filed Feb. 9, 1994 and the prior application is incorporated herein by reference.

BACKGROUND OF THE INVENTION

1. Field of the Invention

2. Overview of the Prior Art

In the growing of most plant products, plowing is a necessary and integral operation. The reasons for the plowing and the seasonal times in which plowing is conducted may vary from one farming operation to another. However, one of the principal reasons for plowing is to bury ground stubble and/or undesirable plants after a crop has been harvested and to insure that no undesirable growth, such as weed growth is still present on the surface, so that the surface may be prepared for the planting of a new crop.

In my U.S. Pat. No. 5,063,999, dated Nov. 12, 1991 for "Moldboard Plow Apparatus For Switching Soil Strips From One Furrow To Another", I have provided a unique moldboard plow apparatus which is capable of mixing up soil by removing soil strips from furrows and depositing them in other furrows. While this apparatus is highly effective, there has, nevertheless, been a need for a multi-function tillage apparatus which has several different capabilities.

An efficient tillage tool should produce a seed bed with the top layer of soil, namely, that layer which includes stubble and weeds, turned under. A tillage tool of this type should also have the capability of breaking up large clods of soil and also breaking up hard pan and loosening compacted soil beneath the root zone. A tillage tool of this type should also desirably leave the soil surface flat after tillage for immediate planting or subsequent operations, such as harrowing or furrowing.

Tillage tools of the type described should also be effective in having a minimum drawbar pull and should preferably be relatively low in maintenance and repair. When the tool is disabled for purposes of repair or maintenance, farming operations with that tool are effectively halted.

Another important condition for any type of tillage tool is that it should operate effectively across a wide range of soil conditions. It may be appreciated that soil conditions can vary dramatically from one area to another. Moreover, these conditions will also vary dramatically, depending upon weather conditions and the like. Finally, attachments should be capable of being easily added or removed from the tillage tool to reduce the amount of down time and the amount of expensive labor involved in the addition and removal of such attachments.

In addition to the moldboard plow apparatus which I have provided, as described in the aforesaid U.S. Pat. No. 5,063,999, there are also numerous other moldboard plows. Indeed, moldboard plows have been used for centuries in various forms. A few of the early moldboard plows are described in U.S. Pat. No. 1,320 to Barnaby and in U.S. Pat. No. 114,044 to L. P. Rider. The conventional moldboard plow, as used in early times and as presently used, shears a strip of soil from the ground and then inverts it by rolling it over in a manner somewhat similar to the turning of a page in a book. The moldboards also cause a displacement of the removed strip of soil by a distance approximately equal to one furrow width. In this type of plowing operation, fresh soil is exposed on the upper surface of the inverted strip of soil and weeds and stubble are buried under the deposited strip of soil.

This type of soil movement necessarily causes the first strip of soil to be deposited on previously unplowed soil and also causes the opening of a furrow, or channel, in the ground surface. In farm terminology, this operation is described as the first strip of soil "being thrown onto the land." The second and subsequently plowed strips of soil are also thrown into the open furrows made by the previous plows.

The conventional moldboard plow, however, does suffer from a number of deficiencies. The conventional moldboard plows usually include land sides which are designed to provide a balancing of forces imposed from the sides of the plow apparatus. Further, in conventional moldboard plows, the soil is only thrown in one direction. As a result, the plow has a resultant large reaction force which tends to force the plow shares laterally away from the direction of throw. This inherently creates a large amount of frictional force which tends to resist the movement of the plow shares. It is established that frictional forces of this type can result in as much as fifty percent of the total pulling force required. See, for example, Richey, C. B., et al., *Agricultural Engineers Handbook*, McGraw-Hill Book Co., Inc., New York 1961 pp. 130–131.

From the foregoing, it can be seen that the friction of the land sides which are provided on most conventional moldboard plows and the friction from side loads results in a substantial amount of wasted energy. In addition to the above, the angular plan form of the conventional moldboard plow causes the overall length to increase with each added plow width. The plow further tends to move sideways if soil conditions do not maintain a constant landside support. Nevertheless, it may be appreciated that the soil conditions can vary dramatically in a single plot, thereby greatly affecting the side forces imposed on the plow share.

Another one of the deficiencies of the conventional moldboard plow is the fact that soil is moved in one direction only, as indicated above. This would result in the entire original surface of the field being moved over to one end, if the field was plowed in the same manner for an extended period of time. In addition, large clods are usually left unbroken, requiring a second tillage operation to break up the large clods and smooth out the soil surface.

Extended use of a land plot without deep tillage on a periodic basis may produce a compacted layer at the plowed depth (often referred to as "plowpan"). In order to overcome this problem and other problems, it would be desirable to have provisions for adding a sub-soiler for tillage below the plow depth.

In addition to moldboard plows, discs are also frequently used as a tillage device. However, discs also suffer from a large number of disadvantages. One of the main deficiencies of a disc is the fact that it wastes more energy per square foot of tilled soil than does a plow. It also has much higher maintenance and repair costs than a plow. In addition, the use of a disc arrangement has much higher initial costs attached for working the same area and depth of soil at the most efficient depth of approximately one-fourth of disc diameter.

Another one of the deficiencies of the disc arrangement is that it does not completely invert the top layer of soil, stubble and weeds in one pass. Indeed, in many cases, two or more passes may be required to achieve this result. The back of the disc blade tends to pack the soil and which is an undesirable drawback from the very use of the tillage tool. Finally, this device is not usually available with a sub-soiler device, such as "ripper teeth."

It is, therefore, desirable to provide a tillage tool in which lateral loads, e.g. side loads, are balanced and in which frictional forces, as a result of the side loads, can be reduced. It is also desirable to provide a multi-function tillage tool in which the length of the tillage section does not increase proportionately with increases of tillage width, such that the tillage tool would be competitive with the widest disc devices. There are numerous other functions which are desirable in a multi-function tillage tool.

OBJECTS OF THE INVENTION

It is, therefore, one of the primary objects of the present invention to provide a multi-function tillage apparatus which reduces frictional forces as a result of conventional land sides normally provided in moldboard plows.

It is another object of the present invention to provide a multi-function tillage apparatus in which the lateral (side) loads imposed on the apparatus can also be balanced.

It is a further object of the present invention to provide a multi-tillage function apparatus which is capable of criss-crossing adjacent strips of soil laterally for mixing without shifting soil surfaces in only one direction.

It is an additional object of the present invention to provide a multi-function tillage apparatus of the type stated in which stubble and weeds on the top layer of soil, including the top layer itself, can be turned under.

It is still another salient object of the present invention to provide a multi-function tillage apparatus of the type stated in which sub-soiler devices may be sued in addition to, or in place of, moldboard plows on the apparatus in order to break up compacted soil beneath the seed bed.

It is still a further object of the present invention to provide a method of shifting soil strips and mixing of soil strips by removing a pair of soil strips thereby forming furrows and shifting soil there between outwardly so that the soil strips can be deposited in the area of the shifted soil.

It is still a further object of the present invention to provide a multi-function tillage apparatus of the type stated which is highly effective in used and which can be constructed at a relatively low cost.

With the above and other objects in view, my invention resides in the novel features of form, construction, arrangement and combination of parts presently described and pointed out in the claims.

BRIEF SUMMARY OF THE INVENTION

A multi-function tillage apparatus which is capable of criss-crossing adjacent soil strips removed from laterally spaced apart furrows to mix soil without shifting the soil in only one direction normally encountered with conventional moldboard plows. The multi-function tillage apparatus of the present invention is effective in that it actually serves a large number of functions. It can be used as a moldboard plow apparatus, and it also can be used as a disc tillage apparatus. Further, it can be used as a combination thereof. In addition, the multi-function tillage apparatus is capable of being used as a sub-soiler device, either in addition to, or in place of, plows used thereon. In like manner, the apparatus can be used only with plows. Thus, the present apparatus fulfills a large number of functions which were previously satisfied only by different apparatus. In this respect, the apparatus of the invention has some universality in terms of fulfilling a large number of tillage operations.

The multi-function tillage apparatus of the invention is also effective in breaking up large clods of soil. Further, it is designed so that it will leave a relatively flat soil surface. The necessary "roll over", or "switching" mechanisms employed on other devices are not required and are completely eliminated.

One of the important achievements of the multi-function tillage tool is the fact that land sides are completely eliminated. This is important due to the fact that there is now reduced frictional forces on the device, thereby enabling a lower drawbar pull. In addition, there is a balancing of lateral forces imposed on the device.

In one respect of the invention, the multi-function tillage apparatus creates furrows in the soil and shifts soil strips removed from these furrows during tillage thereof. The apparatus preferably comprises first and second plow assemblies on a main frame and on opposite sides thereof for creating first and second furrows by removing soil strips therefrom and depositing the soil strips over a berm area there between. In addition, the multi-function tillage apparatus comprises a pair of rearwardly located plow assemblies for moving the soil under the berm outwardly into the first and second furrows, thereby creating a middle furrow which really constitutes third and fourth furrows and allowing the soil strips initially removed from the first and second furrows to fall into the middle or third and fourth furrows.

In more detail, the multi-function tillage apparatus of the invention comprises a pair of rearwardly located plow assemblies for moving the soil strips outwardly. Here, again, these rearwardly located plow assemblies are also in opposite sides of the main frame. Also, in a preferred embodiment, the front plow assemblies and the rear plow assemblies are all moldboard plow assemblies.

The front plow assemblies have a surface contour and orientation which causes an inversion of the first and second soil strips when depositing the same over the berm area, so that any stubble therein is actually buried in the berm.

Also, in more detail, the rearwardly located plow assemblies are shaped and oriented effectively to loosen the soil in the area between the first and second furrows. In this way, the rearwardly located plow assemblies effectively creates third and fourth furrows which constitute the middle furrow. These rearwardly located plow assemblies push the soil located in the third and fourth furrows out of these furrows and into the first and second furrows. The first and second soil strips are thereupon allowed to fall into the third and fourth furrows as the rearwardly located plow assemblies push the soil from the third and fourth furrows into the first and second furrows, respectively.

It can be observed that by controlling the use of the rear plow assemblies in combination with the front plow assemblies, various combinations can be achieved. If one of the rear plow assemblies was removed, a soil strip under a berm would not e shifted into a furrow made by a front plow assembly. However, if the opposite rear plow assembly was also removed such that both rear plow assemblies were removed, there would be one groove, or furrow, on each side which could function as an irrigation ditch, for example, and with the soil strip remaining on the berm. Thus, the apparatus of the invention has a high degree of versatility in that by using proper combinations of front and rear plows, various results can be achieved.

One of the important aspects of the present invention is the fact that there are no land sides forming part of the tillage apparatus. However, since both the rearwardly and forwardly located plow assemblies push the soil outwardly, the plow assemblies effectively act against the soil pushing against the exterior longitudinal faces of the tillage assembly. In this way, there is actually a balancing of lateral forces across the tillage apparatus and, consequently, a reduction in wasted energy.

Due to the fact that soil conditions rarely provide constant lateral support, the balancing of the forces actually compensates and enables the entire apparatus to move in a generally straight line.

It can also be observed, by virtue of the pattern of soil deposition, that the soil is actually criss-crossed during the tillage operation. In other words, soil is not moved only in one direction.

Another one of the unique aspects of the present invention is the fact that a sub-soiler device may be employed. This type of sub-soiler device may use ripper teeth for tillage below the plowed depth or below the so-called "seed bed." Moreover, by use of this device, large clods are broken. In addition, there is no produced plow pan at the plowed depth.

The present invention also provides a method of tilling the soil and simultaneously forming a pair of spaced-apart furrows with soil strips removed therefrom and deposited over a berm area. In this case, the method also relies upon moving soil between the furrows outwardly into the furrows and allowing the soil strips from the initially formed furrows to fall into the center area.

The present invention has many other objects and advantages which will become more fully apparent from a consideration of the forms in which it may be embodied. These forms are illustrated in the accompanying drawings and described in more detail in the detailed description of this invention. However, it is to be understood that such detailed description and the accompanying drawings are only for purposes of setting forth the general principals of the invention and are not to be taken in a limiting sense.

BRIEF DESCRIPTION OF THE DRAWINGS

Having thus described the invention in general terms, reference will now be made to the accompanying drawings in which:

DETAILED DESCRIPTION OF A PREFERRED EMBODIMENT

Referring now in more detail and by reference characters to the drawings which illustrate a preferred embodiment of the present invention, there is illustrated and described an embodiment of a multi-function tillage tool. The actual construction of the tillage tool is more fully illustrated in FIGS. 1–8 and the operation thereof is more fully illustrated in FIGS. 9–12 of the drawings.

Figure 9:
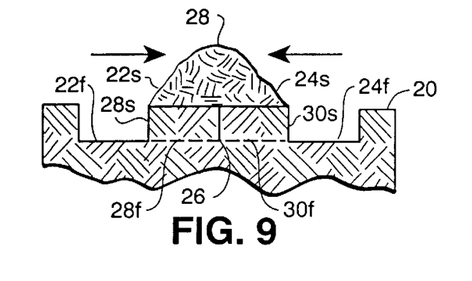
FIG. 9 is a schematic view showing the initial formation of a pair of spaced-apart furrows utilizing the multi-function tillage apparatus of the present invention.

In order to more fully appreciate the present invention, reference is first made to FIG. 9 which shows the unique operations in the forming of furrows and the criss-crossing of soil strips removed from these furrows. A discrete section of the soil is illustrated in FIGS. 9–12 of the drawings. It should also be understood that the upper surface 20 of this soil section would normally have stubble, or other growth, or remnants thereof on the upper surface and it is this upper surface and the stubble thereon which is to be plowed thereunder.

Referring now to FIG. 9, it can be seen that a first furrow 22f and a second spaced-apart furrow 24f are formed in the ground surface. Soil strips 22s and 24s which were removed from the furrows 22f and 24f, respectively, are deposited on a central area 26 as a berm 28. In this case, the berm 28 is actually comprised of a mixture of the soil from the soil strips 22s and 24s.

The central area 26 will actually be divided into a center furrow and, more accurately, a pair of abutting side-by-side furrows 28f and 30f, as also best shown in FIG. 9 of the drawings.

In the actual plowing operation, the front moldboard plow assembly, as hereinafter described, will form the furrows 22f and 24f. Rear moldboard plow assemblies (also as hereinafter described) will literally shove the soil strips designated as 28s and 30s into the furrows 22f and 24f. This will effectively allow the soil forming the berm 28 to fall into the furrows 28f and 30f. More specifically, a major portion of the soil strip 22s will fall into the furrow 28f and a major portion of the soil strip 24s will fall into the furrow 30f.

Figure 10:
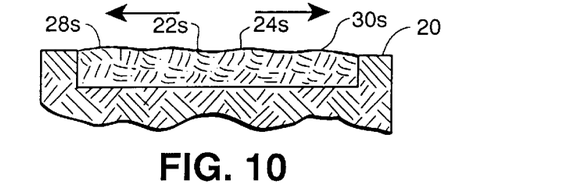
FIG. 10 is a schematic view, somewhat similar to FIG. 9, and showing a further operation in the criss-crossing of soil strips.

When the soil strips 22s and 24s are deposited in the area of the berm 28, they are effectively inverted, so that the stubble and the weeds, and other growth, is forced downwardly into the bed of the berm. As the two rear plow assemblies roll the unplowed center section comprised of soil strips 28s and 30s outwardly, they will effectively allow the berm to collapse into the center furrows 28f and 30f. This will leave an essentially flat surface, as shown in FIG. 10. Moreover, the soil strips 22s and 24s will have been criss-crossed with the respective soil strips 28s and 30s. Flatness is actually controlled by the heights of the moldboards on the two rear plows. Increasing the moldboard height will push more soil away from the plows and decrease the height of the center section.

Figure 11:
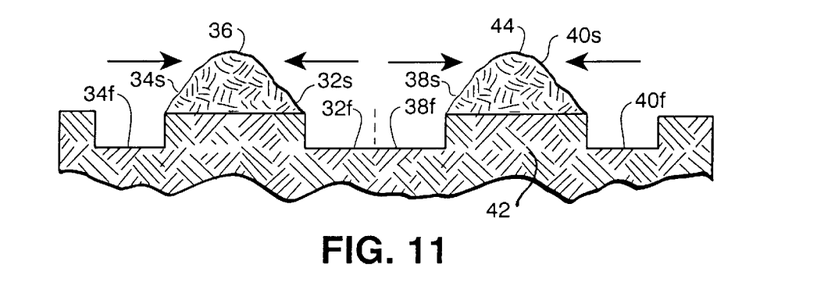
FIG. 11 is a schematic view, similar to FIG. 9, but showing the forming of berms by utilizing four front plows in a side-by-side arrangement.
Figure 12:
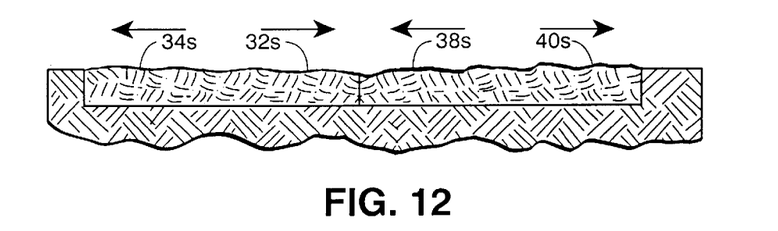
FIG. 12 is a schematic view, somewhat similar to FIG. 10 and showing the leveling and criss-crossing of soil strips in a further operation using four side-by-side rear plows in accordance with the present invention.

FIGS. 11 and 12 more fully illustrate a soil shifting arrangement when two pairs of front plows and two pairs of rear plows are used on the tillage apparatus. One of the pairs of front plows forms a pair of laterally spaced-apart (in the direction of movement of the apparatus) furrows 32f and 34f. The soil strips 32s and 34s which were removed from the furrows 32f and 34f, respectively, are inverted and are effectively rolled into a berm 36 formed between the furrows 32f and 34f, as best illustrated in FIG. 11 of the drawings. In like manner, a second pair of front plows forms furrows 38f and 40f, with the soil strips 38s and 40s removed therefrom, are dumped onto a center strip 42 to form a berm 44, also as best illustrated I FIG. 11 of the drawings.

Further movement of the tillage apparatus will cause the rear plows to move the soil under the berms 36 into the furrows 34f and 32f. This will allow the soil on the top of the center section, namely the soil strips 32s and 34s to fall into the area of the soil under the berm. In like manner, the second pair of rear plows will shift the soil in the section 42 into the respective furrows 38f and 40f, thereby allowing the soil strips 38s and 40s to fall into the region which was previously occupied by the section 42. The result is, therefore, best illustrated in FIG. 12 of the drawings.

In accordance with this arrangement, it can be seen that the soil strips removed from the furrows 32f and 34f are criss-crossed with respect to one another, and the same holds true of the soil removed from the furrows 38f and 40f. It should be understood that by connecting additional pairs of rear plows and front plows, it is possible to simultaneously criss-cross additional soil sections or soil strips. The only limit to the number of plows which can be used on the tillage apparatus is the selected furrow width and the practical limits of size, weight and drawbar pull which is available. The front to rear length of the plow sections remains the same, even thought he frame portion forward of the front plows may increase in length for structural purposes.

Figure 1:
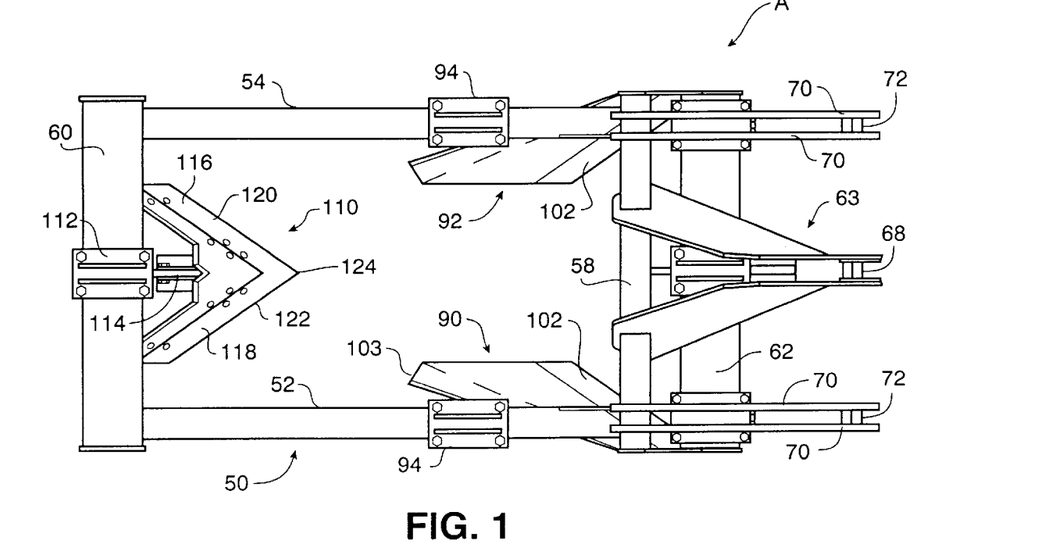
FIG. 1 is a top plan view of a multi-function tillage apparatus constructed in accordance with and embodying the present invention.
Figure 2:
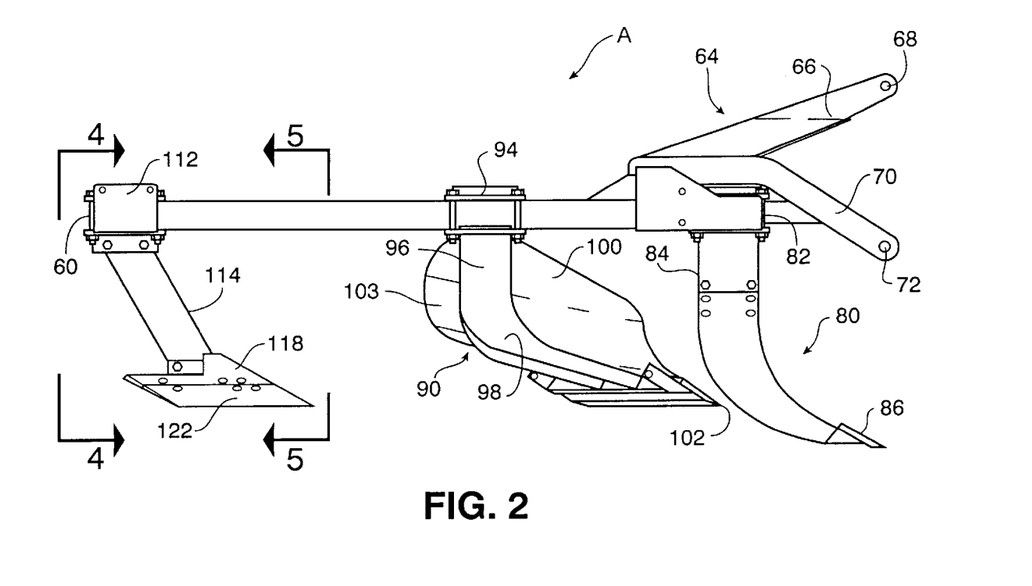
FIG. 2 is a side elevational view of the multi-function tillage apparatus of FIG. 1.
Figure 3:
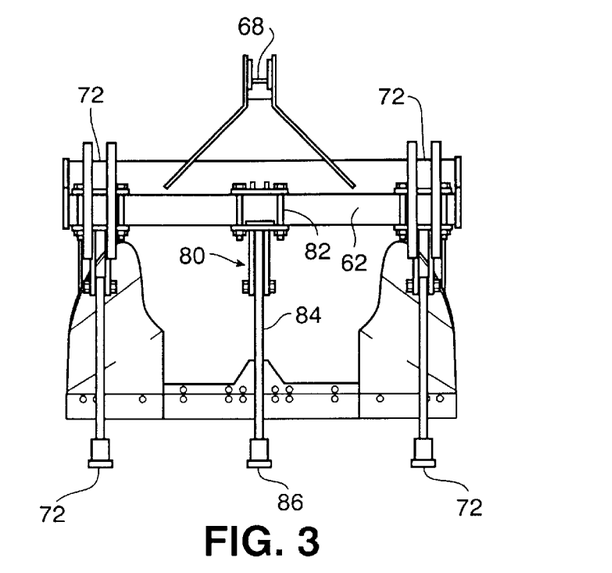
FIG. 3 is a front elevational view of the multi-function tillage apparatus of FIGS. 1 and 2.

Referring now in more detail to FIGS. 1–3 of the drawings, one of the preferred embodiments of the tillage apparatus A is more fully illustrated. The apparatus A is comprised of a main frame 50, having a pair of longitudinally extending main beams 52 and 54 which are connected by a forwardly located lateral cross bar 58 and a rearwardly located cross beam 60. A forwardly located cross beam 62 also extends across the longitudinal beams 52 and 54, as best illustrated in FIGS. 1–3 of the drawings.

Mounted on and extending forwardly from the crossbar 58 is a hitch arrangement 63, comprised of a pair of mast plates 64 which are integrally provided with upwardly and outwardly extending arms 66 having outer ends to serve as a pair of first upper hitch points 68. Two pair of forwardly and downwardly extending arms 70 also provide a second pair of hitch points 70.

Mounted on the forward cross-beam 62 is at least one sub-soiler assembly 80 which generally comprises an upper clamp 82 for securement to the forwardly located cross beam 62, along with a depending shank 84. A sub-soiler shovel, or so-called "point" 86 is mounted on the lower end of the shank 84. Moreover, and by reference to FIGS. 1 and 2, it can be observed that the point 86 extends forwardly of the shank 84 and almost to the hitch points 68 and 72. The sub-soiler assembly 80 is designed to break large clods of soil and effectively provide tillage below the plow depth. In this respect, and by reference to FIG. 2, it can be seen that the sub-soiler point 86 extends to a depth below that of the plows, as hereinafter described.

In one important aspect of the present invention, the sub-soiler assembly 80 can be used in addition to the plows, as hereinafter described, or in place of the plows. In like manner, moldboard plows can be used in place of the sub-soiler assembly 80. As also preciously described, various combinations of the front and rear plow assemblies can also be used in place of, or in addition to, the sub-soiler assembly. Thus, the tillage apparatus of the invention can function as a plow, or as a sub-soiler or as a combination device which effectively performs both plowing and sub-soiling.

The sub-soiler teeth are used to break up the soil in the front of the plows to decrease clod size and thereby decrease the amount of force required for the plows to shear the furrows loose. The teeth on the sub-soiler arrangement can be spaced at variable distances to accommodate different requirements. When a plow sole is present, the sub-soiler arrangement can be spaced at variable distances to accommodate different requirements. When a plowsole is present, the sub-soiler teeth may be sued to loosen compacted soil during routine tillage operations and without the need of a separate operation.

Mounted rearwardly of the sub-soiler assembly 80 is a pair of front plow assemblies 90 and 92. Since each of the front plow assemblies 90 and 92 are substantially identical in both construction and operation, one of these plow assemblies is hereinafter described in detail. However, it should be understood that the plow assembly 92 is, in effect, a mirror image of the plow assembly 90 and only effectively throws soil in the opposite direction with respect to the plow assembly 90.

Figure 6:
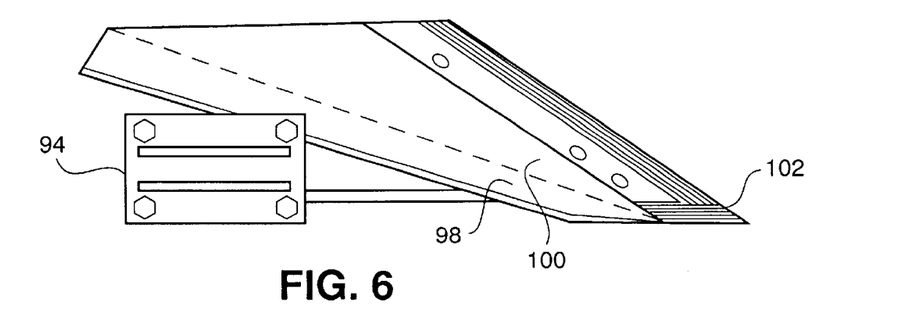
FIG. 6 is a top plan view of one moldboard plow forming a front plow assembly of the present invention.
Figure 7:
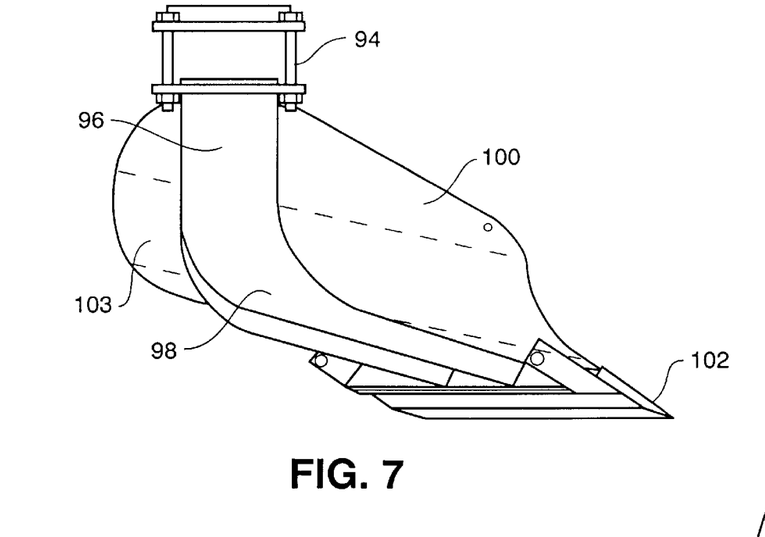
FIG. 7 is a side elevational view of the moldboard plow assembly of FIG. 6.
Figure 8:
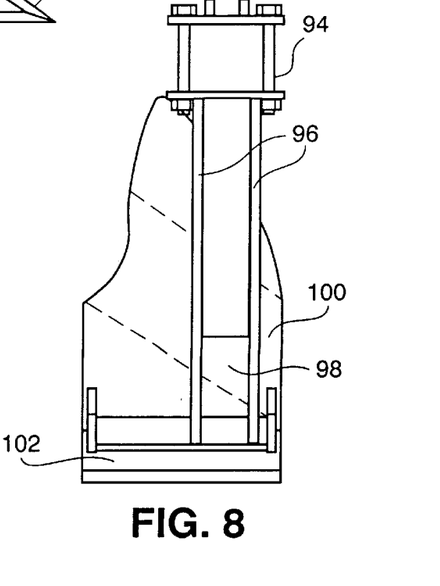
FIG. 8 is a rear elevational view of the moldboard plow assembly of FIGS. 6 and 7.

The front plow assembly 90 is more fully illustrated in FIGS. 6–8 of the drawings and comprises an upper mounting clamp 94 which may adopt the form of a nut arrangement for securing the plow assembly to the main frame. Two depending shanks or strips 96 extend downwardly from the clamp 94 and are provided with forwardly moldboard or scoop sections 100. The scoop sections 100 are curved, as hereinafter described, so as to enable the tossing of a soil strip to one side.

The shanks 96 are integrally provided with an inner strut and an out strut 98. Mounted at the lower and forwardly projecting end of each of the moldboard or scoop sections 100 is a plow share 102 which effectively enables a digging into the soil and a lifting of the soil removed from the ground. The plow assemblies 92 each have curved rear sections 103 integral with the scoop sections 100 to enable a tossing of a soil strip. In this case, since the tillage apparatus is moved in a forwardly direction, a continuous strip of soil is removed from the ground surface.

It can be seen that the moldboard 100 is both sized and shaped so as to effectively cause a soil strip removed from a furrow in the soil to be shifted to one side and simultaneously dumped off of the moldboard 100. For this purpose, each moldboard 100 is provided with a rear curved area 103. In effect, when a soil strip is formed by movement of the tillage apparatus in a forward direction, the soil strip will effectively ride along the surface of the moldboard 100 rearwardly and upwardly. It will then be caused to shift to one side and simultaneously inverted. In this way, the growth, or stubble, which may have existed on the surface of the soil strip is effectively turned under. When the soil is deposited on a berm, the growth and other stubble, weeds and the like, are then buried in the middle of the berm.

In the embodiment of the invention as illustrated, a pair of soil strips will be sheared from the ground surface and moved upwardly and laterally on moldboard surfaces 100 of the plows as the plows and the tillage apparatus is moved forwardly. Furthermore, two furrows which are spaced apart from each other will also be formed as the soil strips are removed from the ground surface. As the soil strips move upwardly along the plane shares of the plow, they will effectively be turned over because of the surface curvature of the plane shares and when deposited on the berm, the stubble and growth on the soil strips will be buried in the ground, as aforesaid. In this respect, the moldboard plows operate in a manner somewhat similar to that of the moldboard plows described in U.S. Pat. No. 5,063,999, dated Nov. 12, 1991.

Figure 4:
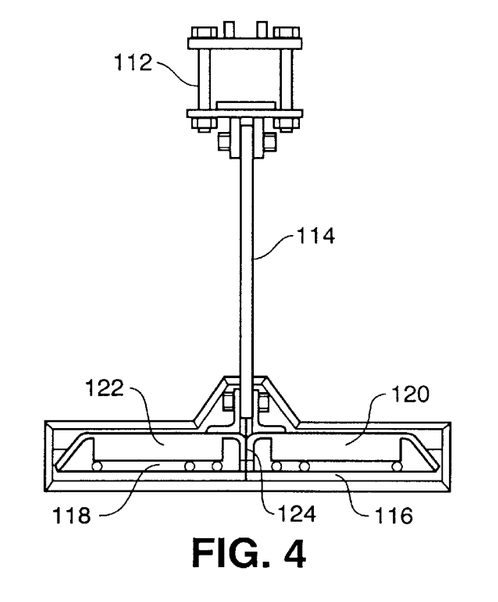
FIG. 4 is a rear elevational view of a rear plow assembly forming part of the apparatus of the present invention and taken substantially along the plane of line 4—4 of FIG. 2.
Figure 5:
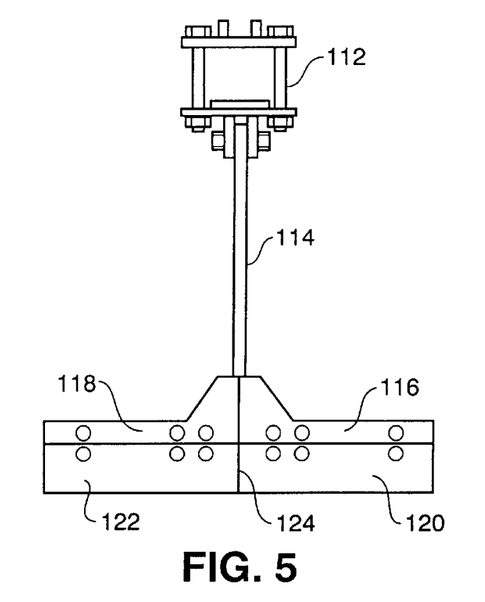
FIG. 5 is a front elevational view of the rear plow assembly and taken substantially along the plane of line 5—5 of FIG. 2.

Mounted at the rear of the frame on the cross beam 60 is a rear plow assembly 110 which comprises a clamp 112 mounted on the laterally extending cross beam 60 and which carries a downwardly and slightly forwardly extending shank 114, as also best illustrated in FIGS. 2, 4 and 5 of the drawings. In the embodiment of the invention as illustrated, a pair of rear plow assemblies are used and this rear plow assembly 110 effectively operates as a pair of plows.

Mounted on the lower end of the shank 114 is a rear plow assembly left base 116 and a rear assembly right base 118, thereby forming a left plow 120 and a right plow 122. By reference to FIGS. 1, 3 and 5 of the drawings, it can be seen that the left plow 120 is located at an angular relationship to the right plow 122 an the two plows converge at a point 124. As the rear plow assembly moves forwardly, the two plow assemblies 102 and 122 will effectively divide the counter soil strip and use a type of camming effect to force the soil in the center soil strip into the previously formed furrows. Thus, the soil immediately beneath the berm is effectively shifted to the side into the two furrows and is not raised or tossed in the manner as accomplished with the moldboard plow apparatus described and illustrated and claimed in U.S. Pat. No. 5,063,999, dated Nov. 12, 1991.

In accordance with the present invention, it can be seen that the front plow assemblies remove soil strips from the ground and form furrows therein. The soil strips are effectively deposited on a central berm located between the two furrows. Thereafter, as the tillage apparatus is moved forwardly, the rear plow assemblies will effectively divide the soil there beneath into a pair of soil strips and force those soil strips into the previously formed furrows. As a result, the soil strips which were previously deposited in the form of the berm are thereupon allowed to drop into the area from which the soil was previously wedged into the furrows.

Figure 13:
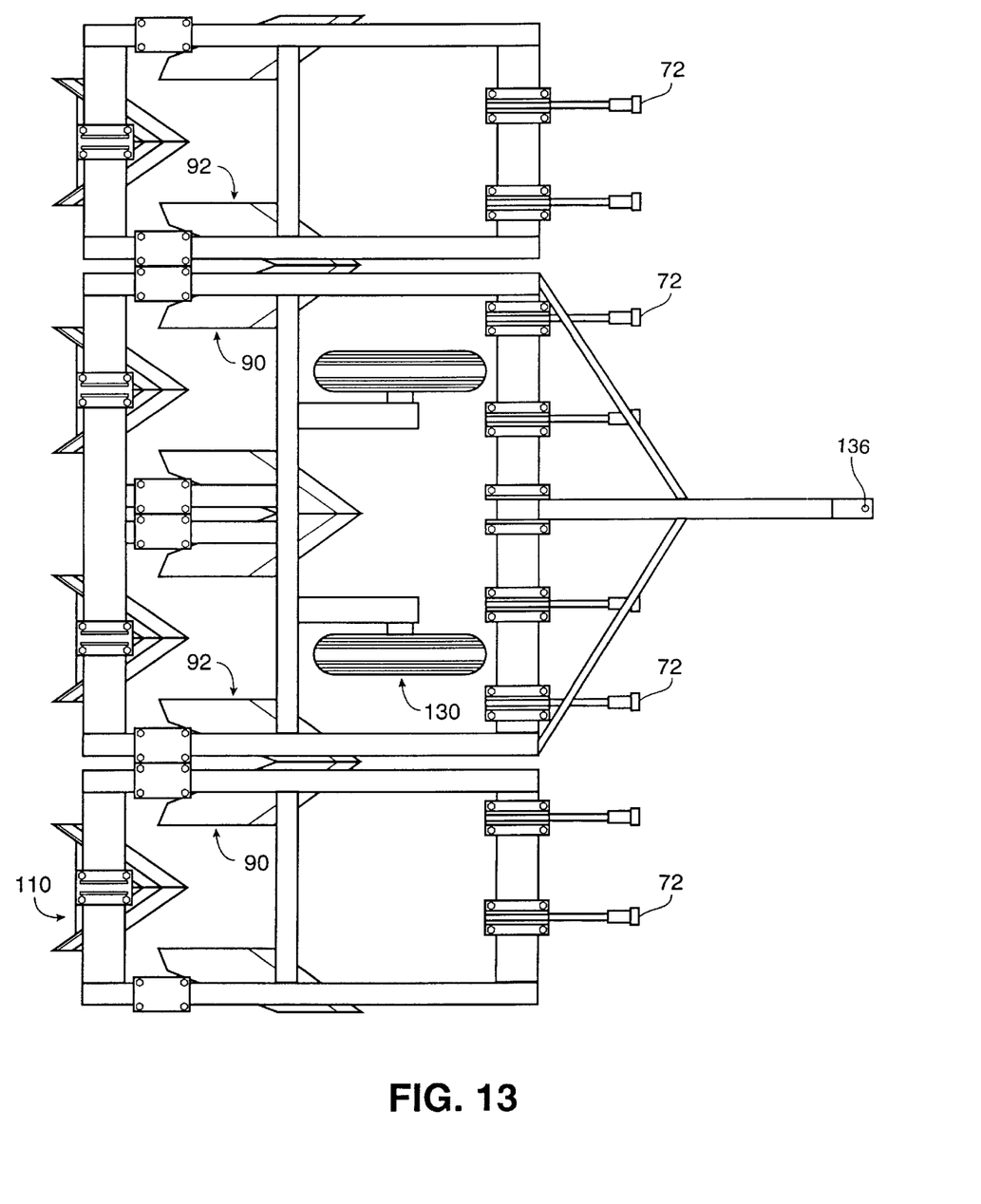
FIG. 13 is a top plan view of an arrangement in which eight individual front plow assemblies are employed; and, FIG. 14 is a side elevational view of the arrangement of FIG. 13.
Figure 14:
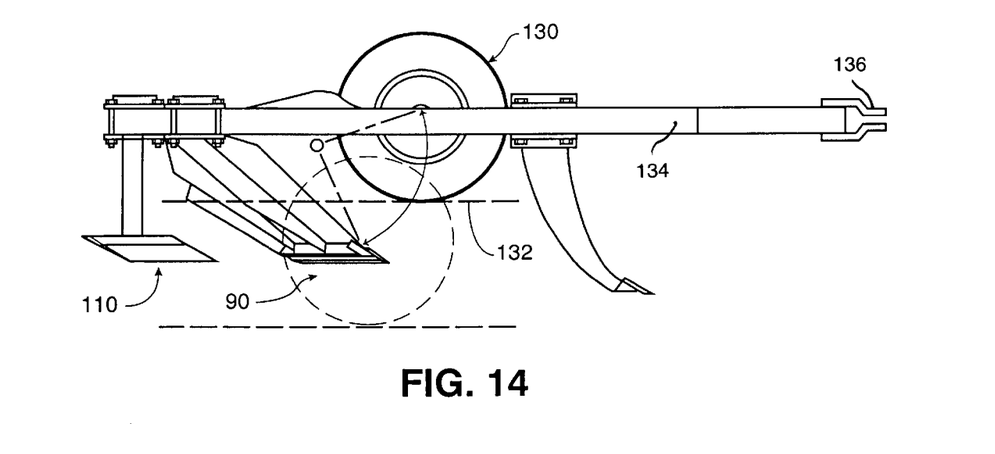

FIGS. 13 and 14 illustrate another variation of the multi-function tillage apparatus in which a combination of front plow assemblies and rear plow assemblies are also used. These FIGS. 13 and 14 merely illustrate one version in which several of the tillage apparatus can be coupled together. As indicated previously, there is no limitation on the effective length, but rather only on the effective width of the tillage apparatus, except for practical considerations of drawbar pull and the like, as previously described.

The tillage apparatus of FIGS. 13 and 14 is suitably mounted on gage lift wheels 130, as best indicated in FIG. 14 and which ride upon a ground surface 132. In this case, it can be seen that the gage lift wheels 130 have a height relative to the frame of the tillage apparatus which is variable. In this way, it is possible to adjust the depth of the front and rear plows, as well as the sub-soiler assembly. A main hitch 134, which is a standard tongue hitch arrangement, is also provided on the apparatus and has a hitch point 136.

The tillage apparatus of the present invention is highly effective in that it produces a seed bed for new planting with the top layer of the soil, including the stubble and weeds thereon, turned under the soil. The apparatus also breaks up the hard pan and loosens compacted soil beneath the root zone. Furthermore, the apparatus may be adjusted to leave the soil surface in a relatively flat condition so that subsequent planting operations or harrowing are not precluded.

One of the important aspects of the present invention is the fact that there are no lateral forces on the apparatus. In effect, the forces are balanced laterally across the apparatus as the apparatus is moved longitudinally. As a result, only a minimal amount of drawbar pull is required. Not only does this result in reduced drawbar pull, but it also reduces the incidence of maintenance and repair. Further, many attachments can be easily provided in this tillage apparatus.

The tillage apparatus of the inception has essentially balanced friction forces laterally imposed on the apparatus. As indicated previously, the apparatus does not use land sides and, furthermore, since the soil is effectively criss-crossed, as previously described, there are minimum lateral friction forces imposed on the apparatus. Furthermore, the tendency for the plow to move to one side or the other when soil conditions are not constant has been minimized.

Another one of the important aspects of the present invention, is that the soil is not moved in only one direction. As indicated, the soil is actually criss-crossed from one furrow to the other so that there is always a thorough mixing of the soil. Simultaneously with the mixing, large clods are broken and thereby avoid the need for a second tillage operation. AS also indicated previously, sub-soiler teeth, or so-called "ripper teeth", can also be used for tillage below the plow depth surface.

Thus, there has been illustrated and described a unique and novel multi-function tillage apparatus which allows removal of soil strips from the ground surface and the criss-crossing of the ground strips, as well as simultaneously inverting the ground strips. The tillage apparatus has numerous functional capabilities and thereby fulfills all of the objects and advantages which have been sought. It should be understood that many changes, modifications, variations and other uses and applications will become apparent to those skilled in the art after considering this specification and the accompanying drawings. Therefore, any and all such changes, modifications, variations and other uses and applications which do not depart from the spirit and scope of the invention are deemed to be covered by the invention.

Having thus described my invention, what I desire to claim and secure by Letters Patent is:

1. A multi-function tillage apparatus for creating furrows in the soil and shifting soil strips removed from the furrows during tillage thereof, said apparatus comprising:

a) a main frame;

b) first and second plow assemblies on said main frame on opposite sides thereof for creating first and second furrows by removing first and second soil strips therefrom and depositing same over a berm area there between; and c) a rearwardly located plow assembly for moving the soil under the berm outwardly into the first and second furrows thereby creating a middle furrow and allowing the soil on the berm to fall into the middle furrow.

2. The multi-function tillage apparatus of claim 1 further characterized in that said rearwardly located plow assembly is disposed equidistant between said first and second plow assemblies for moving the soil strips outwardly.

3. The multi-function tillage apparatus of claim 2 further characterized in that the rearwardly located plow assembly are shaped and oriented to effectively loosen the soil in the area between the first and second furrows, thereby effectively creating third and fourth furrows, said third and fourth furrows comprising one of the furrows and pushing the soil from the third and fourth furrows into the first and second furrows.

4. The multi-function tillage apparatus of claim 3 further characterized in that the first and second soil strips are allowed to fall into the third and fourth furrows as the rearwardly located plow assembly pushes the soil from the third and fourth furrows into the first and second furrows respectively.

5. The multi-function tillage apparatus of claim 1 further characterized in that the first and second plow assemblies are moldboard plow assemblies.

6. The multi-function tillage apparatus of claim 5 further characterized in that the first and second plow assemblies have a surface contour and orientation which causes an inversion of the first and second soil strips when depositing over the berm area so that any stubble therein is buried in the berm.

7. Apparatus comprising, in combination:
   a) a first plow; said first plow adapted to cut a first furrow in the ground as the apparatus is moved forward, and forming a first soil strip from said first furrow, said first plow constructed to cause said first soil strip to be reoriented and deposited on the ground in proximity to said first furrow; and
   b) a second plow; said second plow adapted to cut a second furrow in the ground beneath said reoriented first soil strip, said second plow being constructed to cause said second soil strip to be reoriented and deposited in said first furrow, thereby causing said first soil strip to fall into said second furrow.

8. The apparatus of claim 7 further characterized in that the said second plow is spaced rearwardly of the first plow on the apparatus with respect to the forward movement of the apparatus.

9. The apparatus of claim 8 further characterized in that the said second plow is also offset to the said side of the first plow with respect to the forward movement of the apparatus.

10. The apparatus of claim 7 further characterized in that said apparatus comprises:
    a) a pair of laterally spaced apart first plows for forming a pair of first soil sections and a corresponding pair of first furrows; and
    b) a pair of laterally arranged second plows for shifting a pair of second soil sections into the respective pair of first furrows and allowing the first soil sections to fall into the areas previously occupied by the second soil sections.

11. A method of tilling soil by creating furrows in the soil and shifting soil strips removed therefrom during tillage, said method comprising:
    a) removing a pair of spaced-apart soil strips from a ground surface to thereby simultaneously form first and second furrows therein;
    b) depositing first and second soil strips removed from the first and second furrows on a berm;
    c) cutting at least one furrow beneath said berm and causing the at least one of said first and second soil strips to be deposited in said first and second furrows; and
    d) causing said first and second soil strips deposited on said berm to fall into at least one of said first and second said furrows cut there beneath.

12. The method of claim 11 further characterized in that the first and second furrows are formed by a pair of first plow assemblies, and that the soil underneath the berm is shifted by a second plow assembly.

13. The method of claim 11 further characterized in that the method inverts the first and second soil strips when depositing on the berm so that any stubble therein is buried in the berm.

14. A method of plowing soil and criss-crossing soil sections, such that a first soil section is introduced in a position previously occupied by a second soil section and where the second soil section is introduced into a position previously occupied by the first soil section, said method comprising:
    a) removing a soil section from the ground and forming a furrow therein;
    b) reorienting the first soil section and depositing the same on the ground in a position on top of a second soil section;
    c) shifting the second soil section into the furrow; and
    d) allowing the first soil section to fall into the area previously occupied by the second soil section.

15. The method of claim 14 further characterized in that the furrow is formed by a first plow and the shifting of the second soil section is performed by a second plow located rearwardly with respect to the first plow.

16. The method of claim 14 further characterized in that the method comprises the removal of a first pair of first soil sections and a corresponding pair of first furrows, the method further comprises shifting the said first soil sections between the pair of first furrows and allowing the said first soil sections to fall into the area previously occupied by the said second soil section.

* * * * *